US00RE41849E

(19) United States
(12) Reissued Patent
Wolrich et al.

(10) Patent Number: US RE41,849 E
(45) Date of Reissued Patent: *Oct. 19, 2010

(54) PARALLEL MULTI-THREADED PROCESSING

(75) Inventors: Gilbert Wolrich, Framingham, MA (US); Debra Bernstein, Sudbury, MA (US); Matthew J. Adiletta, Worcester, MA (US); William Wheeler, Southborough, MA (US)

(73) Assignee: Intel Corporation, Santa Clara, CA (US)

( * ) Notice: This patent is subject to a terminal disclaimer.

(21) Appl. No.: 11/159,427

(22) Filed: Jun. 22, 2005

Related U.S. Patent Documents

Reissue of:
(64) Patent No.: 6,587,906
Issued: Jul. 1, 2003
Appl. No.: 10/339,221
Filed: Jan. 9, 2003

U.S. Applications:
(63) Continuation of application No. 09/470,541, filed on Dec. 22, 1999, now Pat. No. 6,532,509.

(51) Int. Cl.
*G06F 13/00* (2006.01)
*G06F 13/14* (2006.01)

(52) U.S. Cl. ..... 710/240; 710/52; 718/104
(58) Field of Classification Search ..... 718/1, 718/100, 102, 103, 104, 106, 107; 710/305, 710/240–244, 200, 40, 107, 52, 56, 20, 7, 710/105, 313, 310; 712/32, 36; 370/464, 370/910; 709/200, 201, 217, 231, 104; 711/148, 711/150, 151; 361/679, 683, 760
See application file for complete search history.

(56) References Cited

U.S. PATENT DOCUMENTS 3,373,408 A 3/1968 Ling
3,478,322 A 11/1969 Evans
3,623,001 A 11/1971 Kleist et al.
3,736,566 A 5/1973 Anderson et al.
3,792,441 A 2/1974 Wymore et al.
3,889,243 A 6/1975 Drimak
3,940,745 A 2/1976 Sajeva
4,016,548 A 4/1977 Law et al.
4,032,899 A 6/1977 Jenny et al.
4,075,691 A 2/1978 Davis et al.
4,130,890 A 12/1978 Adam
4,400,770 A 8/1983 Chan et al.
4,514,807 A 4/1985 Nogi
4,523,272 A 6/1985 Fukunaga et al.
4,658,351 A 4/1987 Teng (Continued)

FOREIGN PATENT DOCUMENTS

EP 0 379 709 * 8/1990
EP 0 464 715 * 1/1992

(Continued)

OTHER PUBLICATIONS

"Performance modeling and architecture exploration of network processors" by Govind et al. (abstract only) Publication Date: Sep. 19–22, 2005.*

(Continued)

*Primary Examiner*—Glenn A Auve
(74) *Attorney, Agent, or Firm*—Blakely, Sokoloff, Taylor & Zafman LLP

(57) ABSTRACT

A parallel, multi-threaded processor system and technique for arbitrating command requests is described. The system includes a plurality of microengines, a plurality of shared system resources and a global command arbiter. The global command arbiter uses a command request protocol that is based on the shared system resources and command type to grant or deny a microengine command request for a shared resource.

41 Claims, 4 Drawing Sheets

U.S. PATENT DOCUMENTS

| | | | | |
|---|---|---|---|---|
| 4,709,347 | A | | 11/1987 | Kirk |
| 4,745,544 | A | | 5/1988 | Renner et al. |
| 4,788,640 | A | | 11/1988 | Hansen |
| 4,831,358 | A | | 5/1989 | Ferrio et al. |
| 4,858,108 | A | | 8/1989 | Ogawa et al. |
| 4,866,664 | A | | 9/1989 | Burkhardt, Jr. et al. |
| 4,890,218 | A | | 12/1989 | Bram |
| 4,890,222 | A | | 12/1989 | Kirk |
| 4,991,112 | A | | 2/1991 | Callemyn |
| 5,115,507 | A | | 5/1992 | Callemyn |
| 5,140,685 | A | | 8/1992 | Sipple et al. |
| 5,142,683 | A | | 8/1992 | Burkhardt, Jr. et al. |
| 5,155,831 | A | | 10/1992 | Emma et al. |
| 5,155,854 | A | * | 10/1992 | Flynn et al. ..... 718/104 |
| 5,168,555 | A | | 12/1992 | Byers et al. |
| 5,173,897 | A | | 12/1992 | Schrodi et al. |
| 5,251,205 | A | | 10/1993 | Callon et al. |
| 5,255,239 | A | | 10/1993 | Taborn et al. |
| 5,263,169 | A | * | 11/1993 | Genusov et al. ..... 712/7 |
| 5,313,454 | A | | 5/1994 | Bustini et al. |
| 5,347,648 | A | | 9/1994 | Stamm et al. |
| 5,367,678 | A | * | 11/1994 | Lee et al. ..... 718/104 |
| 5,379,295 | A | | 1/1995 | Yonehara |
| 5,379,432 | A | | 1/1995 | Orton et al. |
| 5,390,329 | A | | 2/1995 | Gaertner et al. |
| 5,392,391 | A | | 2/1995 | Caulk, Jr. et al. |
| 5,392,411 | A | | 2/1995 | Ozaki |
| 5,392,412 | A | | 2/1995 | McKenna |
| 5,404,464 | A | | 4/1995 | Bennett |
| 5,404,469 | A | | 4/1995 | Chung et al. |
| 5,404,482 | A | | 4/1995 | Stamm et al. |
| 5,432,918 | A | | 7/1995 | Stamm |
| 5,448,702 | A | | 9/1995 | Garcia, Jr. et al. |
| 5,450,351 | A | | 9/1995 | Heddes |
| 5,452,437 | A | | 9/1995 | Richey et al. |
| 5,452,452 | A | | 9/1995 | Gaetner et al. |
| 5,459,842 | A | | 10/1995 | Begun et al. |
| 5,459,843 | A | | 10/1995 | Davis et al. |
| 5,463,625 | A | | 10/1995 | Yasrebi |
| 5,467,452 | A | | 11/1995 | Blum et al. |
| 5,475,856 | A | | 12/1995 | Kogge |
| 5,485,455 | A | | 1/1996 | Dobbins et al. |
| 5,515,296 | A | | 5/1996 | Agarwal |
| 5,517,648 | A | | 5/1996 | Bertone et al. |
| 5,539,737 | A | | 7/1996 | Lo et al. |
| 5,542,070 | A | | 7/1996 | LeBlanc et al. |
| 5,542,088 | A | | 7/1996 | Jennings, Jr. et al. |
| 5,544,236 | A | | 8/1996 | Andruska et al. |
| 5,550,816 | A | | 8/1996 | Hardwick et al. |
| 5,557,766 | A | | 9/1996 | Takiguchi et al. |
| 5,568,476 | A | | 10/1996 | Sherer et al. |
| 5,568,617 | A | | 10/1996 | Kametani |
| 5,574,922 | A | | 11/1996 | James |
| 5,581,729 | A | | 12/1996 | Nishtala et al. |
| 5,592,622 | A | | 1/1997 | Isfeld et al. |
| 5,613,071 | A | | 3/1997 | Rankin et al. |
| 5,613,136 | A | | 3/1997 | Casavant et al. |
| 5,617,327 | A | | 4/1997 | Duncan |
| 5,623,489 | A | | 4/1997 | Cotton et al. |
| 5,627,829 | A | | 5/1997 | Gleeson et al. |
| 5,630,074 | A | | 5/1997 | Beltran |
| 5,630,130 | A | | 5/1997 | Perotto et al. |
| 5,633,865 | A | | 5/1997 | Short |
| 5,644,623 | A | | 7/1997 | Gulledge |
| 5,649,110 | A | | 7/1997 | Ben-Nun et al. |
| 5,649,157 | A | | 7/1997 | Williams |
| 5,651,002 | A | | 7/1997 | Van Seters et al. |
| 5,659,687 | A | | 8/1997 | Kim et al. |
| 5,680,641 | A | | 10/1997 | Sidman |
| 5,689,566 | A | | 11/1997 | Nguyen |
| 5,692,126 | A | | 11/1997 | Templeton et al. |
| 5,699,537 | A | | 12/1997 | Sharangpani et al. |
| 5,701,434 | A | | 12/1997 | Nakagawa |
| 5,717,898 | A | | 2/1998 | Kagan et al. |
| 5,721,870 | A | | 2/1998 | Matsumoto |
| 5,724,574 | A | | 3/1998 | Stratigos et al. |
| 5,740,402 | A | | 4/1998 | Bratt et al. |
| 5,742,587 | A | | 4/1998 | Zornig et al. |
| 5,742,782 | A | | 4/1998 | Ito et al. |
| 5,742,822 | A | | 4/1998 | Motomura |
| 5,745,913 | A | | 4/1998 | Pattin et al. |
| 5,751,987 | A | | 5/1998 | Mahant-Shetti et al. |
| 5,754,764 | A | | 5/1998 | Davis et al. |
| 5,761,507 | A | | 6/1998 | Govett |
| 5,761,522 | A | | 6/1998 | Hisanaga et al. |
| 5,764,915 | A | | 6/1998 | Heimsoth et al. |
| 5,768,528 | A | | 6/1998 | Stumm |
| 5,781,551 | A | | 7/1998 | Born |
| 5,781,774 | A | | 7/1998 | Krick |
| 5,784,649 | A | | 7/1998 | Begur et al. |
| 5,784,712 | A | | 7/1998 | Byers et al. |
| 5,796,413 | A | | 8/1998 | Shipp et al. |
| 5,797,043 | A | | 8/1998 | Lewis et al. |
| 5,805,816 | A | | 9/1998 | Picazo, Jr. et al. |
| 5,809,235 | A | | 9/1998 | Sharma et al. |
| 5,809,237 | A | | 9/1998 | Watts et al. |
| 5,809,530 | A | | 9/1998 | Samra et al. |
| 5,812,868 | A | | 9/1998 | Moyer et al. |
| 5,828,746 | A | | 10/1998 | Ardon |
| 5,828,863 | A | | 10/1998 | Barrett et al. |
| 5,828,881 | A | | 10/1998 | Wang |
| 5,828,901 | A | | 10/1998 | O'Toole et al. |
| 5,832,215 | A | | 11/1998 | Kato et al. |
| 5,835,755 | A | | 11/1998 | Stellwagen, Jr. |
| 5,838,988 | A | | 11/1998 | Panwar et al. |
| 5,850,399 | A | | 12/1998 | Ganmukhi et al. |
| 5,850,530 | A | | 12/1998 | Chen et al. |
| 5,854,922 | A | | 12/1998 | Gravenstein et al. |
| 5,857,188 | A | | 1/1999 | Douglas |
| 5,860,138 | A | | 1/1999 | Engebretsen et al. |
| 5,860,158 | A | | 1/1999 | Pai et al. |
| 5,886,992 | A | | 3/1999 | Raatikainen et al. |
| 5,887,134 | A | | 3/1999 | Ebrahim |
| 5,890,208 | A | | 3/1999 | Kwon |
| 5,892,979 | A | | 4/1999 | Shiraki et al. |
| 5,898,686 | A | | 4/1999 | Virgile |
| 5,898,701 | A | | 4/1999 | Johnson |
| 5,905,876 | A | | 5/1999 | Pawlowski et al. |
| 5,905,889 | A | | 5/1999 | Wilhelm, Jr. |
| 5,909,686 | A | | 6/1999 | Muller et al. |
| 5,915,123 | A | | 6/1999 | Mirsky et al. |
| 5,918,235 | A | | 6/1999 | Kirshenbaum et al. |
| 5,933,627 | A | | 8/1999 | Parady |
| 5,937,187 | A | | 8/1999 | Kosche et al. |
| 5,938,736 | A | | 8/1999 | Muller et al. |
| 5,940,612 | A | | 8/1999 | Brady et al. |
| 5,940,866 | A | | 8/1999 | Chisholm et al. |
| 5,946,487 | A | | 8/1999 | Dangelo |
| 5,948,081 | A | | 9/1999 | Foster |
| 5,953,336 | A | | 9/1999 | Moore et al. |
| 5,958,031 | A | | 9/1999 | Kim |
| 5,961,628 | A | | 10/1999 | Nguyen et al. |
| 5,968,169 | A | | 10/1999 | Pickett |
| 5,970,013 | A | | 10/1999 | Fischer et al. |
| 5,974,518 | A | | 10/1999 | Nogradi |
| 5,978,838 | A | | 11/1999 | Mohamed et al. |
| 5,983,274 | A | | 11/1999 | Hyder et al. |
| 5,995,513 | A | | 11/1999 | Harrand et al. |
| 6,012,151 | A | | 1/2000 | Mano |
| 6,014,729 | A | * | 1/2000 | Lannan et al. ..... 711/150 |
| 6,023,742 | A | | 2/2000 | Ebeling et al. |

6,032,190 A 2/2000 Bremer et al.
6,032,218 A 2/2000 Lewin et al.
6,047,002 A 4/2000 Hartmann et al.
6,049,867 A 4/2000 Eickemeyer et al.
6,058,168 A 5/2000 Braband
6,061,710 A 5/2000 Eickemeyer et al.
6,067,300 A 5/2000 Baumert et al.
6,067,585 A 5/2000 Hoang
6,070,231 A 5/2000 Ottinger
6,072,781 A 6/2000 Feeney et al.
6,073,215 A 6/2000 Snyder
6,079,008 A 6/2000 Clery, III
6,085,215 A 7/2000 Ramakrishnan et al.
6,085,248 A 7/2000 Sambamurthy et al.
6,085,294 A 7/2000 Van Doren et al.
6,092,127 A 7/2000 Tausheck
6,092,158 A 7/2000 Harriman et al.
6,104,700 A 8/2000 Haddock et al.
6,111,886 A 8/2000 Stewart
6,112,016 A 8/2000 MacWilliams et al.
6,122,251 A 9/2000 Shinohara
6,128,669 A 10/2000 Moriarty et al.
6,134,665 A 10/2000 Klein et al.
6,141,677 A 10/2000 Hanif et al.
6,141,689 A 10/2000 Yasrebi
6,141,765 A 10/2000 Sherman
6,144,669 A 11/2000 Williams et al.
6,145,054 A 11/2000 Mehrotra et al.
6,157,955 A 12/2000 Narad et al.
6,160,562 A 12/2000 Chin et al.
6,170,051 B1 1/2001 Dowling
6,175,927 B1 1/2001 Cromer et al.
6,182,177 B1 1/2001 Harriman
6,195,676 B1 2/2001 Spix et al.
6,199,133 B1 3/2001 Schnell
6,201,807 B1 3/2001 Prasanna
6,212,542 B1 4/2001 Kahle et al.
6,212,544 B1 4/2001 Borkenhagen et al.
6,212,604 B1 4/2001 Tremblay
6,212,611 B1 4/2001 Nizar et al.
6,216,220 B1 4/2001 Hwang
6,223,207 B1 4/2001 Lucovsky et al.
6,223,238 B1 4/2001 Meyer et al.
6,223,243 B1 4/2001 Ueda et al.
6,223,274 B1 4/2001 Catthoor et al.
6,223,279 B1 4/2001 Nishimura et al.
6,247,025 B1 6/2001 Bacon
6,256,713 B1 7/2001 Audityan et al.
6,269,391 B1 7/2001 Gillespie
6,272,109 B1 8/2001 Pei et al.
6,272,520 B1 8/2001 Sharangpani et al.
6,272,616 B1 8/2001 Fernando et al.
6,275,505 B1 8/2001 O'Loughlin et al.
6,279,113 B1 8/2001 Vaidya
6,282,169 B1 8/2001 Kiremidjian
6,286,083 B1 9/2001 Chin et al.
6,289,011 B1 9/2001 Seo et al.
6,295,600 B1 9/2001 Parady
6,298,370 B1 10/2001 Tang et al.
6,307,789 B1 10/2001 Wolrich et al.
6,311,261 B1 10/2001 Chamdani et al.
6,320,861 B1 11/2001 Adam et al.
6,324,624 B1 11/2001 Wolrich et al.
6,335,932 B2 1/2002 Kadambi et al.
6,338,078 B1 1/2002 Chang et al.
6,345,334 B1 2/2002 Nakagawa et al.
6,347,344 B1 * 2/2002 Baker et al. ..... 710/20
6,349,331 B1 2/2002 Andra et al.
6,356,962 B1 3/2002 Kasper
6,359,911 B1 3/2002 Movshovich et al.
6,360,262 B1 3/2002 Guenthner et al.
6,360,277 B1 3/2002 Ruckley et al.
6,366,998 B1 4/2002 Mohamed
6,373,848 B1 4/2002 Allison et al.
6,377,998 B2 4/2002 Noll et al.
6,389,031 B1 5/2002 Chao et al.
6,389,449 B1 5/2002 Nemirovsky et al.
6,393,026 B1 5/2002 Irwin
6,393,483 B1 5/2002 Latif et al.
6,404,737 B1 6/2002 Novick et al.
6,415,338 B1 7/2002 Habot
6,418,488 B1 7/2002 Chilton et al.
6,424,657 B1 7/2002 Voit et al.
6,424,659 B2 7/2002 Viswanadham et al.
6,426,940 B1 7/2002 Seo et al.
6,426,943 B1 7/2002 Spinney et al.
6,427,196 B1 7/2002 Adiletta et al.
6,430,626 B1 8/2002 Witkowski et al.
6,434,145 B1 8/2002 Opsasnick et al.
6,438,132 B1 8/2002 Vincent et al.
6,438,134 B1 8/2002 Chow et al.
6,448,812 B1 9/2002 Bacigalupo
6,453,404 B1 9/2002 Bereznyi et al.
6,457,015 B1 9/2002 Eastham
6,463,035 B1 10/2002 Moore
6,463,072 B1 10/2002 Wolrich et al.
6,463,480 B2 10/2002 Kikuchi et al.
6,463,527 B1 10/2002 Vishkin
6,466,898 B1 10/2002 Chan
6,477,562 B2 11/2002 Nemirovsky et al.
6,484,224 B1 11/2002 Robins et al.
6,501,731 B1 12/2002 Bleszynski et al.
6,507,862 B1 1/2003 Joy et al.
6,522,188 B1 2/2003 Poole
6,526,451 B2 2/2003 Kasper
6,526,452 B1 2/2003 Petersen et al.
6,529,983 B1 3/2003 Marshall et al.
6,532,509 B1 * 3/2003 Wolrich et al. ..... 710/240
6,535,878 B1 3/2003 Guedalia et al.
6,552,826 B2 4/2003 Adler et al.
6,553,406 B1 4/2003 Berger et al.
6,560,667 B1 5/2003 Wolrich et al.
6,570,850 B1 5/2003 Gutierrez et al.
6,577,542 B2 6/2003 Wolrich et al.
6,584,522 B1 6/2003 Wolrich et al.
6,604,125 B1 8/2003 Belkin
6,606,704 B1 8/2003 Adiletta et al.
6,625,654 B1 9/2003 Wolrich et al.
6,628,668 B1 9/2003 Hutzli et al.
6,629,147 B1 9/2003 Grow
6,629,236 B1 9/2003 Aipperspach et al.
6,631,422 B1 10/2003 Althaus et al.
6,631,430 B1 10/2003 Wolrich et al.
6,631,462 B1 10/2003 Wolrich et al.
6,657,963 B1 12/2003 Paquette et al.
6,658,551 B1 12/2003 Berenbaum et al.
6,661,774 B1 12/2003 Lauffenburger et al.
6,661,794 B1 12/2003 Wolrich et al.
6,665,699 B1 12/2003 Hunter et al.
6,665,755 B2 * 12/2003 Modelski et al. ..... 710/100
6,667,920 B2 12/2003 Wolrich et al.
6,668,317 B1 12/2003 Bernstein et al.
6,671,827 B2 12/2003 Guilford et al.
6,675,190 B1 1/2004 Schabernack et al.
6,675,192 B2 1/2004 Emer et al.
6,678,746 B1 1/2004 Russell et al.
6,680,933 B1 1/2004 Cheesman et al.
6,681,300 B2 1/2004 Wolrich et al.
6,684,326 B1 1/2004 Cromer et al.
6,694,380 B1 2/2004 Wolrich et al.
6,697,379 B1 2/2004 Jacquet et al.
6,721,325 B1 4/2004 Duckering et al.

| | | | | |
|---|---|---|---|---|
| 6,724,767 | B1 | | 4/2004 | Chong et al. |
| 6,728,845 | B2 | | 4/2004 | Adiletta |
| 6,732,187 | B1 | | 5/2004 | Lougheed et al. |
| 6,754,211 | B1 | | 6/2004 | Brown |
| 6,754,222 | B1 | | 6/2004 | Joung et al. |
| 6,768,717 | B1 | | 7/2004 | Reynolds et al. |
| 6,775,284 | B1 | | 8/2004 | Calvignac et al. |
| 6,792,488 | B2 | | 9/2004 | Wolrich et al. |
| 6,798,744 | B1 | | 9/2004 | Bradshaw et al. |
| 6,826,615 | B2 | | 11/2004 | Barrall et al. |
| 6,834,053 | B1 | | 12/2004 | Stacey et al. |
| 6,850,521 | B1 | | 2/2005 | Kadambi et al. |
| 6,856,622 | B1 | | 2/2005 | Calamvokis et al. |
| 6,873,618 | B1 | | 3/2005 | Weaver |
| 6,876,561 | B2 | | 4/2005 | Adiletta et al. |
| 6,895,457 | B2 | | 5/2005 | Wolrich et al. |
| 6,925,637 | B2 | | 8/2005 | Thomas et al. |
| 6,931,641 | B1 | | 8/2005 | Davis et al. |
| 6,934,780 | B2 | * | 8/2005 | Modelski et al. ..... 710/100 |
| 6,934,951 | B2 | | 8/2005 | Wilkinson et al. |
| 6,938,147 | B1 | | 8/2005 | Joy et al. |
| 6,944,850 | B2 | | 9/2005 | Hooper et al. |
| 6,947,425 | B1 | | 9/2005 | Hooper et al. |
| 6,952,824 | B1 | | 10/2005 | Hooper et al. |
| 6,959,002 | B2 | * | 10/2005 | Wynne et al. |
| 6,967,963 | B1 | * | 11/2005 | Houh et al. |
| 6,976,095 | B1 | * | 12/2005 | Wolrich et al. |
| 6,981,077 | B2 | * | 12/2005 | Modelski et al. ..... 710/100 |
| 6,983,350 | B1 | * | 1/2006 | Wheeler et al. |
| 7,006,495 | B2 | * | 2/2006 | Hooper |
| 7,065,569 | B2 | * | 6/2006 | Teraslinna |
| 7,069,548 | B2 | * | 6/2006 | Kushlis |
| 7,096,277 | B2 | * | 8/2006 | Hooper |
| 7,100,102 | B2 | * | 8/2006 | Hooper et al. |
| 7,111,072 | B1 | * | 9/2006 | Matthews et al. |
| 7,111,296 | B2 | * | 9/2006 | Wolrich et al. |
| 7,124,196 | B2 | * | 10/2006 | Hooper |
| 7,126,952 | B2 | * | 10/2006 | Hooper et al. |
| 7,149,786 | B1 | * | 12/2006 | Bohringer et al. |
| 7,181,742 | B2 | * | 2/2007 | Hooper |
| 7,191,321 | B2 | * | 3/2007 | Bernstein et al. |
| 7,206,858 | B2 | * | 4/2007 | Hooper et al. |
| 7,248,584 | B2 | * | 7/2007 | Hooper |
| 7,305,500 | B2 | | 12/2007 | Adiletta et al. |
| 7,328,289 | B2 | | 2/2008 | Wolrich et al. |
| 7,352,769 | B2 | | 4/2008 | Hooper et al. |
| 2001/0023487 | A1 | | 9/2001 | Kawamoto |
| 2002/0027448 | A1 | | 3/2002 | Bacigalupo |
| 2002/0041520 | A1 | | 4/2002 | Wolrich et al. |
| 2002/0075878 | A1 | | 6/2002 | Lee et al. |
| 2002/0118692 | A1 | | 8/2002 | Oberman et al. |
| 2002/0150047 | A1 | | 10/2002 | Knight et al. |
| 2002/0181194 | A1 | | 12/2002 | Ho et al. |
| 2003/0043803 | A1 | | 3/2003 | Hooper |
| 2003/0067934 | A1 | | 4/2003 | Hooper et al. |
| 2003/0086434 | A1 | | 5/2003 | Kloth |
| 2003/0105917 | A1 | | 6/2003 | Ostler et al. |
| 2003/0110166 | A1 | | 6/2003 | Wolrich et al. |
| 2003/0115347 | A1 | | 6/2003 | Wolrich et al. |
| 2003/0115426 | A1 | | 6/2003 | Rosenbluth et al. |
| 2003/0131198 | A1 | | 7/2003 | Wolrich et al. |
| 2003/0140196 | A1 | | 7/2003 | Wolrich et al. |
| 2003/0145159 | A1 | | 7/2003 | Adiletta et al. |
| 2003/0147409 | A1 | | 8/2003 | Wolrich et al. |
| 2003/0161303 | A1 | | 8/2003 | Mehrvar et al. |
| 2003/0161337 | A1 | | 8/2003 | Weinman |
| 2003/0196012 | A1 | | 10/2003 | Wolrich et al. |
| 2003/0210574 | A1 | | 11/2003 | Wolrich et al. |
| 2003/0231635 | A1 | | 12/2003 | Kalkunte et al. |
| 2004/0039895 | A1 | | 2/2004 | Wolrich et al. |
| 2004/0052269 | A1 | | 3/2004 | Hooper et al. |
| 2004/0054880 | A1 | | 3/2004 | Bernstein et al. |
| 2004/0059828 | A1 | | 3/2004 | Hooper et al. |
| 2004/0071152 | A1 | | 4/2004 | Wolrich et al. |
| 2004/0073728 | A1 | | 4/2004 | Wolrich et al. |
| 2004/0073778 | A1 | | 4/2004 | Adiletta et al. |
| 2004/0085901 | A1 | | 5/2004 | Hooper et al. |
| 2004/0098496 | A1 | | 5/2004 | Wolrich et al. |
| 2004/0109369 | A1 | | 6/2004 | Wolrich et al. |
| 2004/0148382 | A1 | | 7/2004 | Narad et al. |
| 2004/0162933 | A1 | | 8/2004 | Adiletta et al. |
| 2004/0252686 | A1 | | 12/2004 | Hooper et al. |
| 2005/0033884 | A1 | | 2/2005 | Wolrich et al. |
| 2005/0149665 | A1 | | 7/2005 | Wolrich et al. |
| 2006/0007871 | A1 | | 1/2006 | Welin |
| 2006/0069882 | A1 | | 3/2006 | Wheeler et al. |
| 2006/0156303 | A1 | | 7/2006 | Hooper et al. |

FOREIGN PATENT DOCUMENTS

| | | | |
|---|---|---|---|
| EP | 0 633 678 | * | 1/1995 |
| EP | 0 745 933 | * | 12/1996 |
| EP | 0 773 648 | * | 5/1997 |
| EP | 0 809 180 | * | 11/1997 |
| EP | 0 959 602 | | 11/1999 |
| JP | 59-111533 | | 6/1984 |
| WO | WO 94/15287 | | 7/1994 |
| WO | WO 97/38372 | | 10/1994 |
| WO | WO 98/20647 | | 5/1998 |
| WO | WO 00/38376 | | 6/2000 |
| WO | WO 00/56024 | | 9/2000 |
| WO | WO 01/16718 | | 3/2001 |
| WO | WO 01/16769 | | 3/2001 |
| WO | WO 01/16770 | | 3/2001 |
| WO | WO 01/16782 | | 3/2001 |
| WO | WO 01/17179 | | 3/2001 |
| WO | WO 01/31856 | | 5/2001 |
| WO | WO 01/48596 | | 7/2001 |
| WO | WO 01/48606 | | 7/2001 |
| WO | WO 01/48619 | | 7/2001 |
| WO | WO 01/50247 | | 7/2001 |
| WO | WO 01/50679 | | 7/2001 |
| WO | WO 03/030461 | | 4/2003 |

OTHER PUBLICATIONS

"10–/100–Mbps Ethernet Media Access Controller (MAC) Core", NEC, 1988, pp. 1–5.

"Enterprise Hardware, Intel Expected to Unveil New Networking Chip," News.Com, Aug. 26, 1999, <http://new.com.com/Intel+expected+to+unveil+new+networking+chip/2100–1001_3230315.html> (accessed on Aug. 23, 2005), pp. 1–5.

"The ATM Forum Technical Committee Traffic Management Specification Version 4.1", The ATM Forum (Mar. 1999).

Beckerle, M.J., "Overview of the START (*T) multithreaded computer" (abstract only), Publication Date: Feb. 22–26, 1993.

Byrd et al., "Multithread Processor Architectures," *IEEE Spectrum,* 32(8):38–46, New York, Aug. 1995.

Chandranmenon, G.P., et al., "Trading Packet Headers for Packet Processing" *IEEE/ACM Transactions on Networking,* 4(2):141–152, Apr. 1996.

*Dictionary of Computer Words: An A to Z Guide to Today's Computers, Revised Edition,* Houghton Mifflin Company: Boston, Massachusetts, pp. 220, (1995).

*Digital Semiconductor 21140A PCI Fast Ethernet LAN Controller, Hardware Reference Manual,* Digital Equipment Corporation, pp. i–x, 1–1 through 1–5, 2–1 throught 2–12, 3–1 through 3–38, 4–31 through 5–2, 6–1 through 6–24, (Mar. 1998).
Doyle et al., *Microsoft Press Computer Dictionary,* 2nd ed., Microsoft Press, Redmond, Washington, USA, p. 326, (1994).
Fillo et al., "The M–Machine Multicomputer," *IEEE Proceedings of MICRO–28,* pp. 146–156, (1995).
Frazier, Howard, "Gigabit Ethernet: From 100 to 1,000 Mbps", *IEEE Internet Computing,* pp. 24–31, (1999).
Frazier, Howard, "The 802.3z Gigabit Ethernet: Standard", *IEEE Network,* pp. 6–7, (1998).
Giroux, N., et al., "Queuing and Scheduling: Quality of Service in ATM Networks, Chapter 5", *Quality of Service in ATM Networks: State–of–the–Art Traffic Management,* pp. 96–121 (1998).
Gomez et al., "Efficient Multithreaded User–Space Transport for Network Computing: Design and Test of the TRAP Protocol," *Journal of Parallel and Distributed Computing,* Academic Press, Duluth, Minnesota, USA, 40(1):103–117, Jan. 1997.
Haug et al., "Reconfigurable hardware as shared resource for parallel threads," *IEEE Symposium on FPGAs for Custom Computing Machines,* 2 pages, (1998).
Hauser et al., "Garp: a MIPS processor with a reconfigurable coprocessor," *Proceedings of the 5th Annual IEEE Symposium on Field–Programmable Custom Computing Machines,* pp. 12–21, (1997).
Hyde, R., "Overview of Memory Management," *Byte,* 13(4):219–225, (1988).
Ippoliti, A., et al., "Parallel Media Access Controller for Packet Communications at Gb/s Rates", *IEEE,* pp. 991–996, (1990).
Jenks, S., et al., "Nomadic Threads: A migrating multithread approach to remote memory accesses in multiprocessors" (abstract only), Publication Date: Oct. 20–23, 1996.
Kaiserswerth, M., "The parallel Protocol Engine", *IEEE/ACM Transactions on Networking,* 1(6):650–663, Dec. 1993.
Khailany, B., et al., "Imagine: Media Processing with Streams," IEEE Micro, Mar.–Apr. 2001, pp. 35–46.
Leon–Garcia, A., *Communication Networks: Fundamental Concepts and Key Architectures,* McGraw–Hill Higher Education, Copyright 2000, pp. 195–198, 215–219, & 380–385.
Lim, A., et al., "Improving Performance of Adaptive Media Access Control Protocols for High–Density Wireless Networks", *Proceedings of the 1999 International Symposium on Parallel Architectures, Algorithms and Networks* (*ISPAN 'pp*) , pp. 316–321, Jun. 1999.
Litch et al., "StrongARMing Portable Communications," *IEEE Micro,* 18(2):48–55, Mar. 1998.
Mollenauer, J.F., et al., "An Efficient Media Access Control Protocol for Broadband Wireless Access Systems" *IEEE Standard, IEEE 802.16 Broadband Wireless Access Working Group,* 19 pages, Oct. 1999.
Ocheltree, K.B., et al., "A Comparison of fibre channel and 802 MAC services", *Proceedings of 18th Conference on Local Computer Networks,* abstract only, 1 page, Sep. 1993.
Schmidt et al., "The Performance of Alternative Threading Architectures for Parallel Communication Subsystems," Internet Document, *Online*!, Nov. 13, 1998, pp. 1–19.
Shaw, M.C., et al., *UNIX Internals: A Systems Operations Handbook,* Windcrest Books, pp. 30–37, 1987.
Thistle et al., "A Processor Architecture for Horizon," *IEEE Proc. Supercomputing* '88, pp. 35–41, Nov. 1988.
Todorova, P., et al., "Quality–of–Service–Oriented Media Access Control for Advanced Mobile Multimedia Satellite Systems", *Proceedings of the 36th Annual Hawaii International Conference on System Sciences* (*HICSS'03*), 8 pages, Jan. 2003.
Tremblay et al., "A Three Dimensional Register File for Superscalar Processors," *IEEE Proceedings of the 28th Annual Hawaii International Conference on System Sciences,* pp. 191–201, (1995).
Trimberger et al, "A time–multiplexed FPGA," *Proceedings of the 5th Annual IEEE Symposium on Field–Programmable Custom Computing Machines,* pp. 22–28, (1997).
Turner et al., "Design of a High Performance Active Router," Internet Document, *Online*!, 20 pages, Mar. 18, 1999.
Vibhatavanij et al., "Simultaneous Multithreading–Based Routers," *Proceedings of the 2000 International Conference of Parallel Processing,* Toronto, Ontario, Canada, Aug. 21–24, 2000, pp. 362–369.
Vuppala, V., et al., "Layer–3 switching using virtual network ports", *IEEE Proc. Computer Communications and Networks,* pp. 642–648, 1999.
Wazlowski et al., "PRSIM–II computer and architecture," *IEEE Proceedings, Workshop on FPGAs for Custom Computing Machines,* pp. 9–16, (1993).
Wikipedia entry, "Media Access Control", retrieved from http://en.wikipedia.org/wiki/Media_access_control, 2 pages, Jul. 31, 2007.
U.S. Appl. No. 09/473,571, filed Dec. 28, 1999, Wolrich et al.
U.S. Appl. No. 09/475,614, filed Dec. 30, 1999, Wolrich et al.
Agarwal et al., "April: A Processor Architecture for Multiprocessing", Laboratory for Computer Science, MIT, 1990 IEEE, pp. 104–114.
Chappell et al., "Simultaneous Subordinate Microthreading (SSMT)", 1999 IEEE, pp. 186–195.
Farrens et al., "Strategies for Achieving Improved Processor Throughput," 1991 ACM, pp. 362–369.

* cited by examiner

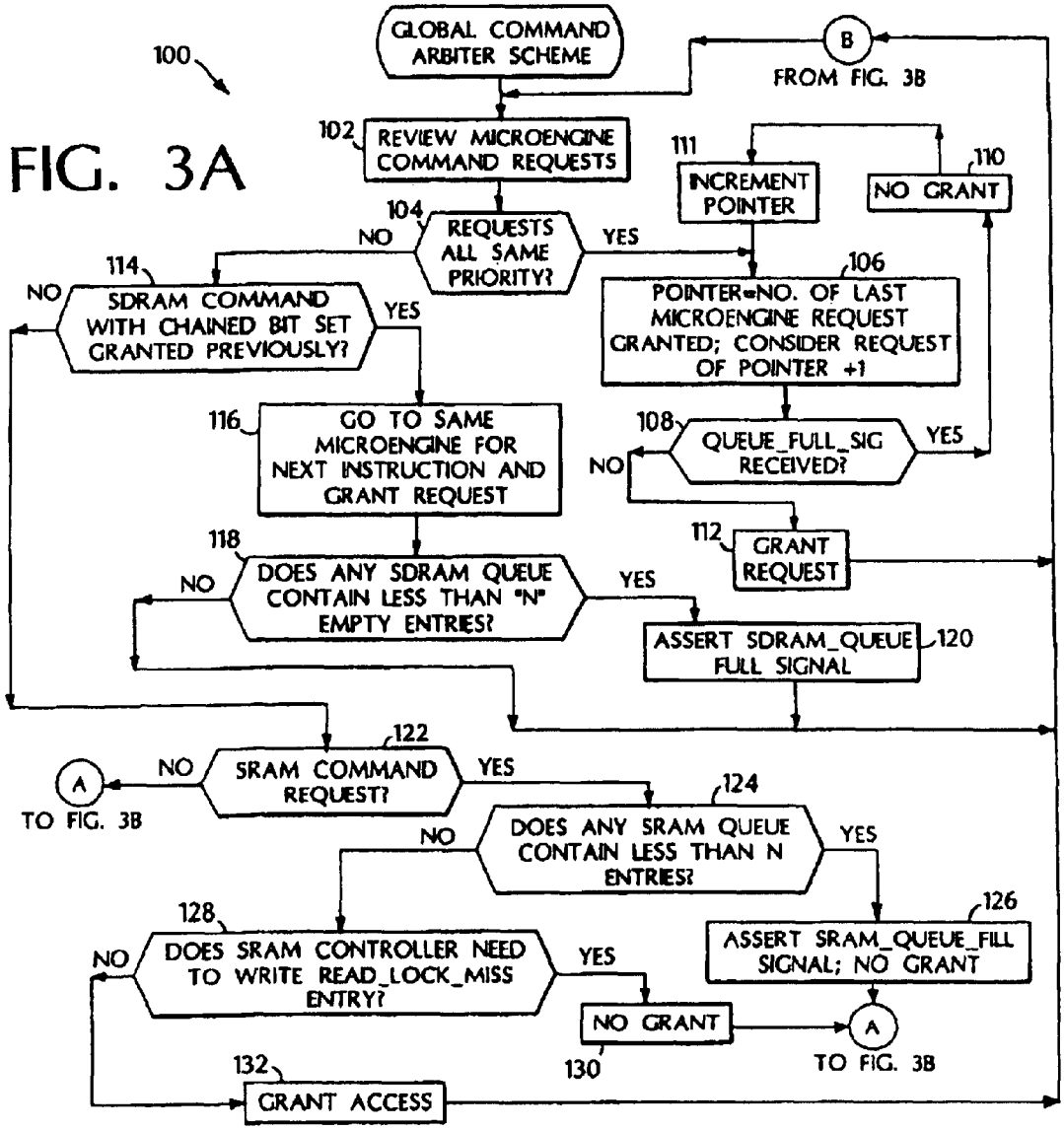
FIG. 3A
100
GLOBAL COMMAND ARBITER SCHEME
B
FROM FIG. 3B
102
REVIEW MICROENGINE COMMAND REQUESTS
104
REQUESTS ALL SAME PRIORITY?
NO
YES
111
INCREMENT POINTER
110
NO GRANT
106
POINTER=NO. OF LAST MICROENGINE REQUEST GRANTED; CONSIDER REQUEST OF POINTER +1
108
QUEUE_FULL_SIG RECEIVED?
YES
NO
112
GRANT REQUEST
114
SDRAM COMMAND WITH CHAINED BIT SET GRANTED PREVIOUSLY?
NO
YES
116
GO TO SAME MICROENGINE FOR NEXT INSTRUCTION AND GRANT REQUEST
118
DOES ANY SDRAM QUEUE CONTAIN LESS THAN "N" EMPTY ENTRIES?
NO
YES
ASSERT SDRAM_QUEUE FULL SIGNAL
120
122
SRAM COMMAND REQUEST?
NO
YES
A
TO FIG. 3B
124
DOES ANY SRAM QUEUE CONTAIN LESS THAN N ENTRIES?
NO
YES
126
ASSERT SRAM_QUEUE_FILL SIGNAL; NO GRANT
128
DOES SRAM CONTROLLER NEED TO WRITE READ_LOCK_MISS ENTRY?
NO
YES
NO GRANT
130
A
TO FIG. 3B
132
GRANT ACCESS

PARALLEL MULTI-THREADED PROCESSING

Matter enclosed in heavy brackets [ ] appears in the original patent but forms no part of this reissue specification; matter printed in italics indicates the additions made by reissue.

This application is a continuation of U.S. application Ser. No. 09/470,541 filed on Dec. 22, 1999, now U.S. Pat. No. 6,532,509.

BACKGROUND OF THE INVENTION

This invention relates to a protocol for providing parallel, multi-threaded processors with high bandwidth access to shared resources.

Parallel processing is an efficient form of computer information processing of concurrent events. Certain problems may be solved by applying parallel computer processing, which demands concurrent execution of many programs to do more than one thing at the same time. Unlike a serial paradigm where all tasks are performed sequentially at a single station, or a pipelined machine where tasks are performed at specialized stations, parallel processing requires that a plurality of stations have the capability to perform all tasks. In general, all or a plurality of the stations work simultaneously and independently on the same or common elements of a problem.

Types of computer processing include single instruction stream, single data stream, which is the conventional serial von Neumann computer that includes a single stream of instructions. A second processing type is the single instruction stream, multiple data streams process (SIMD). This processing scheme may include multiple arithmetic-logic processors and a single control processor. Each of the arithmetic-logic processors performs operations on the data in lock step and are synchronized by the control processor. A third type is multiple instruction streams, single data stream (MISD) processing which involves processing the same data stream flows through a linear array of processors executing different instruction streams. A fourth processing type is multiple instruction streams, multiple data streams (MIMD) processing which uses multiple processors, each executing its own instruction stream to process a data stream fed to each of the processors. MIMD processors may have several instruction processing units and therefore several data streams.

SUMMARY OF THE INVENTION

According to an aspect of the present invention, a parallel, hardware-based, multi-threaded processor includes a global command arbiter for determining the allocation of access to system resources. The multi-threaded processor system includes a plurality of microengines, a plurality of shared system resources and a global command arbiter. The global command arbiter uses a command request protocol based on the shared system resources and command type to grant or deny a microengine command request for a shared resource. The processor system may be advantageously realized on an integrated circuit chip with minimal wiring and buffer storage elements.

The technique according to the invention provides each microengine with fair access to the shared system resources based on command priority and resource utilization. Consequently, the microengines have high bandwidth access to the shared system resources.

BRIEF DESCRIPTION OF THE DRAWINGS

FIGS. 3A and 3B illustrate a flow chart of an implementation of a global command arbitration process according to the invention.

DESCRIPTION

Figure 1:
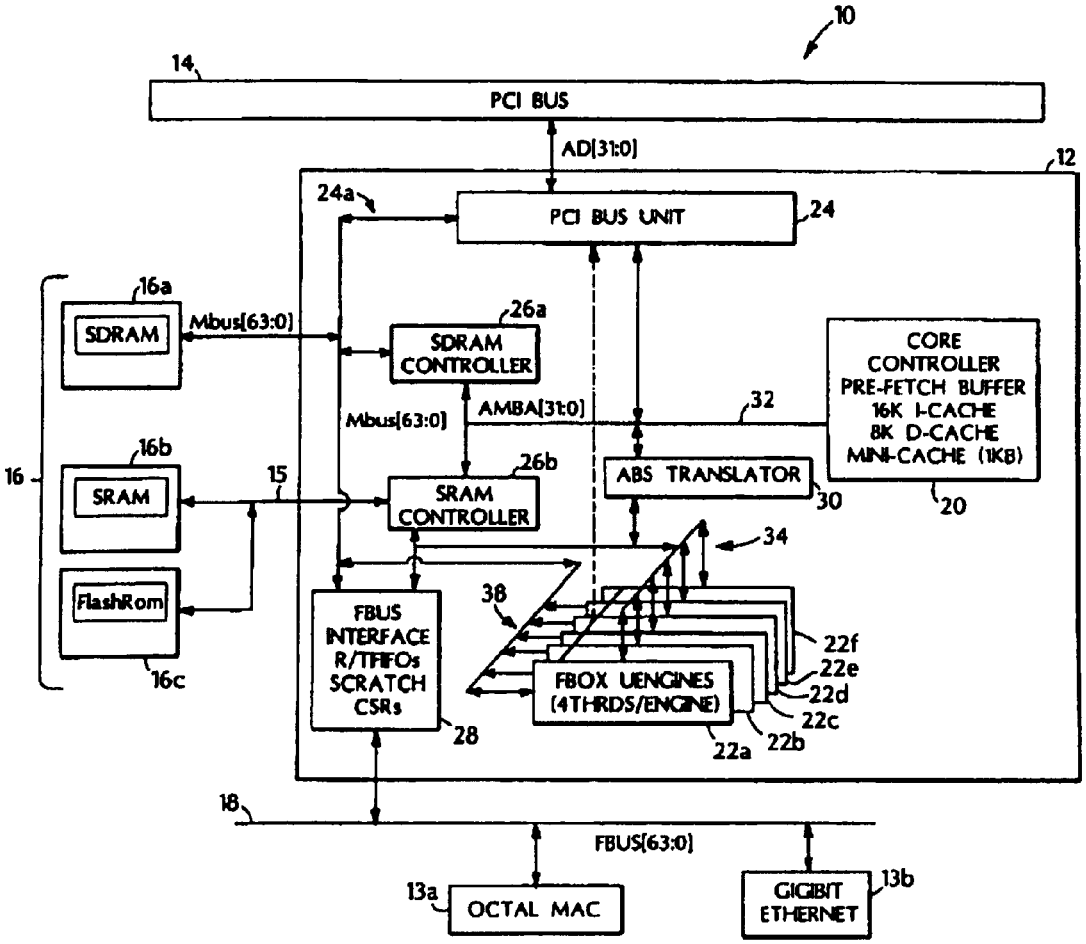
FIG. 1 is a block diagram of a communication system employing a hardware-based multithreaded processor.

FIG. 1 illustrates a communication system 10 that includes a parallel, hardware-based multithreaded processor 12. The system 10 is especially useful for tasks that can be broken into parallel subtasks or functions, and the hardware-based multithreaded processor 12 is particularly useful for tasks that are bandwidth oriented rather than latency oriented.

The hardware-based multithreaded processor 12 may be an integrated circuit, and may be coupled to a bus such as a PCI bus 14, a memory system 16 and a second bus 18. In the illustrated implementation, the hardware-based multithreaded processor 12 has multiple microengines 22a to 22f that each includes multiple hardware-controlled threads that can be simultaneously active and that may independently work on a task. The multithreaded processor 12 also includes a central or core controller 20 that assists in loading microcode control for other resources and performs other general purpose computer-type functions such as handling protocols, handling exceptions, and providing extra support for packet processing, which may occur if the microengines pass the packets off for more detailed processing. In one embodiment, the core controller 20 is a Strong Arm® (Arm is a trademark of ARM Limited, United Kingdom) based architecture embedded general-purpose microprocessor, which includes an operating system. The operating system enables the core processor 20 to call functions to operate on the microengines 22a–22f. The core processor 20 can use any supported operating system but preferably utilizes a real time operating system. Suitable operating systems for a core processor implemented as a Strong Arm architecture microprocessor may include Microsoft NT real-time, VXWorks and μCUS, which is a freeware operating system available over the Internet.

The plurality of functional microengines 22a–22f each maintain a plurality of program counters in hardware, and maintain states associated with the program counters. Each of the six microengines 22a-22f is capable of processing four independent hardware threads. Such processing allows one thread to start executing just after another thread issues a memory reference and then waits until that reference completes before doing more work. This behavior is critical to maintaining efficient hardware execution of the microegines because memory latency may be significant. Stated differently, if only a single thread execution was supported, the microengines would sit idle for a significant number of cycles waiting for references to return and thereby reduce overall computational throughput. Multi-threaded execution allows the microengines to mask memory latency by performing useful independent work across several threads. Effectively, a corresponding plurality of sets of threads can be simultaneously active on each of the microengines 22a–22f while only one is actually operating at any one time.

The six microengines 22a–22f operate with shared system resources including the memory system 16, the PCI bus 14 and the FBUS 18. The memory system 16 may be accessed via a Synchronous Dynamic Random Access Memory (SDRAM) controller 26a and a Static Random Access Memory (SRAM) controller 26b. SDRAM memory 16a and SDRAM controller 26a may be typically used for processing large volumes of data or high bandwidth data, such as processing network payloads from network packets. The SRAM controller 26b and SRAM memory 16b may be used in a networking implementation for low latency, fast access tasks or low bandwidth data, such as accessing look-up tables, memory for the core processor 20, and so forth.

The six microengines 22a–22f access either the SDRAM 16a or SRAM 16b based on characteristics of the data. Low latency, low bandwidth data is stored in and fetched from SRAM 16b, whereas higher bandwidth data for which latency is not as important is stored in and fetched from SDRAM 16a. The microengines 22a–22f can execute memory reference instructions to either the SDRAM controller 26a or SRAM controller 26b.

Advantages of hardware multithreading can be explained in the context of SRAM or SDRAM memory accesses. For example, an SRAM access requested by a Thread_0 from a microengine will cause the SRAM controller 26b to initiate an access to the SRAM memory 16b. The SRAM controller 26b controls arbitration for the SRAM bus 15, accesses the SRAM 16b, fetches the data from the SRAM 16b, and returns data to a requesting microengine 22a–22b. During a SRAM access, if the microengine 22a had only a single thread that could operate, that microengine would be dormant until data was returned from the SRAM. By employing hardware context swapping within each of the microengines 22a–22f, another thread such as Thread_1 can function while the first thread, Thread_0, is awaiting the read data to return. Hardware context swapping enables other contexts with unique program counters to execute in that same microengine. Continuing the example, during execution Thread_1 may access the SDRAM memory 16a. While Thread_1 operates on the SDRAM unit, and Thread_0 is operating on the SRAM unit, a new thread such as Thread_2 can now operate in the microengine 22a. Thread_2 can operate for a certain amount of time until it needs to access memory or perform some other long latency operation, such as making an access to a bus interface. Therefore, the processor 12 can simultaneously perform a bus operation, SRAM operation and SDRAM operation with all being completed or operated upon by one microengine 22a, which microengine 22a has one more thread available to process more work in the data path.

The hardware context swapping also synchronizes completion of tasks. For example, it is possible that two threads could hit the same-shared resource such as the SRAM 16b. Each one of the separate functional units, such as the interface 28, the SRAM controller 26a, and the SDRAM controller 26b, reports back a flag signaling completion of an operation when a requested task from one of the microengine thread contexts is completed. When the flag is received by the microengine, the microengine can determine which thread to turn on.

The processor 12 includes a bus interface 28 that couples the processor to a second bus 18. In an implementation, an FBUS interface 28 couples the processor 12 to the so-called FBUS 18 (FIFO bus). The FBUS is a 64-bit wide FIFO bus, used to interface to Media Access Controller (MAC) devices. The FBUS interface 28 is responsible for controlling and interfacing the processor 12 to the FBUS 18.

The processor 12 also includes a PCI bus interface 24 that couples other system components that reside on the PCI bus 14 to the processor 12. The PCI bus interface 24 also provides a high-speed data path 24a to the SDRAM memory 16a. The data path 24a permits data to be moved quickly from the SDRAM 16a to the PCI bus 14, via direct memory access (DMA) transfers. The hardware based multithreaded processor 12 can employ a plurality of DMA channels so if one target of a DMA transfer is busy, another one of the DMA channels can take over the PCI bus 14 to deliver information to another target to maintain high processor 12 efficiency. The PCI bus interface 24 supports image transfers, target operations and master operations. Target operations are operations where slave devices on bus 14 access the SDRAM through reads and writes that are serviced as a slave to target operation. In master operations, the processor core 20 sends data directly to or receives data directly from the PCI interface 24.

Each of the functional units of the processor 12 are coupled to one or more internal buses. In an implementation, the internal buses are dual 32-bit buses (i.e., one bus for read and one for write). The multithreaded processor 12 also is constructed such that the sum of the bandwidths of the internal buses exceeds the bandwidth of external buses coupled to the processor 12. The internal core processor bus 32 may be an Advanced System Bus (ASB bus) that couples the processor core 20 to the memory controllers 26a and 26b and to an ASB translator 30. The ASB bus is a subset of an "AMBA" bus that is used with the Strong Arm processor core. The processor 12 also includes a private bus 34 that couples the microengine units to SRAM controller 26b, ASB translator 30 and FBUS interface 28. A memory bus 38 couples the SDRAM controller 26a, the PCI bus interface 24, the FBUS interface 28 and memory system 16 together, including Flash ROM 16c which is used for boot operations and the like.

The hardware-based multithreaded processor 12 may be utilized as a network processor. As a network processor, the hardware-based multithreaded processor 12 interfaces to network devices such as a media access controller (MAC) device such as a 10/100BaseT Octal MAC 13a or a Gigabit Ethernet device 13b. In general, the hardware-based multithreaded processor 12 can interface to any type of communication device or interface that receives/sends large amount of data. The communication system 10 functioning in a networking application could receive a plurality of network packets from the devices 13a, 13b and process each of those packets independently in a parallel manner.

The processor 12 may also be utilized as a print engine for a postscript processor, as a processor for a storage subsystem such as RAID disk storage, or as a matching engine. In the securities industry for example, the advent of electronic trading requires the use of electronic matching engines to match orders between buyers and sellers. These and other parallel types of tasks can be accomplished on the system 10.

Figure 2:
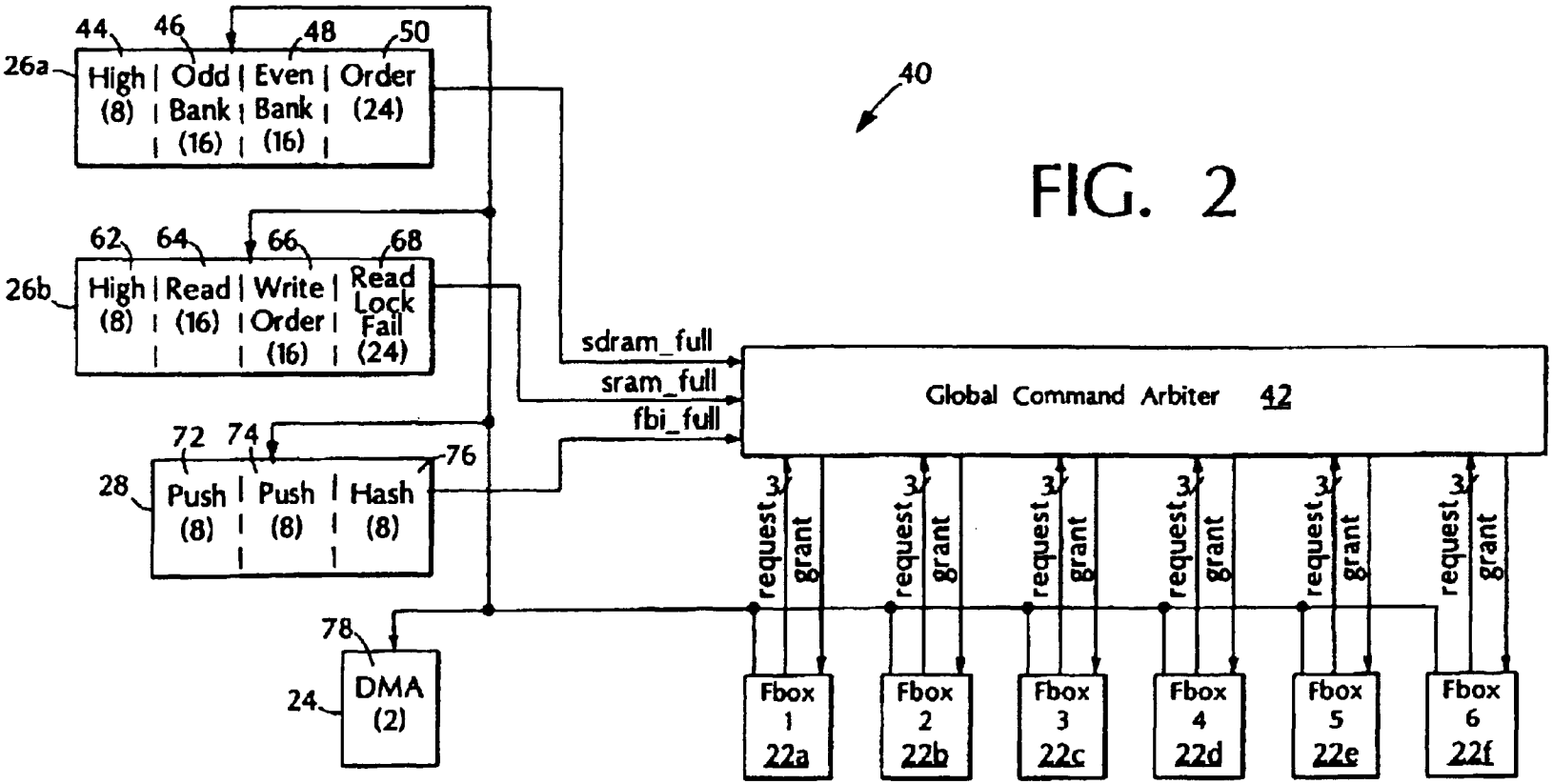
FIG. 2 is a simplified block diagram of a global arbitration system for a multithreaded process according to the invention.

FIG. 2 shows a global arbitration system 40 for use with the multithreaded processor 12 of FIG. 1. A global command arbiter 42 is connected to each of the microengines 22a–22f, to the SDRAM controller 26a, to the SRAM controller 26b, to the interface 28 and to the PCI interface 24. The global command arbiter 42 functions to provide high bandwidth access to the shared system resources utilizing a minimal amount of buffer storage elements and minimal wiring. The global command arbiter provides each microengine 22a–22f with fair access to the common system resources of the SDRAM, SRAM, PCI interface registers and FBUS interface registers based on command priority and resource utilization, which is explained below.

In an implementation, each microengine 22a–22f has a two-command deep first-in, first-out (FIFO) register for issuing command requests for SDRAM 16a and SRAM 16b memory access, and for issuing command requests for access to registers in the PCI interface 24 and FBUS interface 28. The SDRAM controller 26a queues commands from the microengines in one of four FIFO command queue structures: an eight-entry high-priority queue 44, a sixteen-entry odd bank queue 46, a sixteen-entry even bank queue 48, and a twenty-four entry maintain order queue 50. A single physical random access memory (RAM) structure with four input pointers and four output pointers may be used to implement the SDRAM queues 44, 46, 48, 50. A reference request from a microengine may include a bit set called the "optimized MEM bit" which will be sorted into either the odd bank queue 46 or the even bank queue 48. If the memory reference request does not have a memory optimization bit set, the default will be to go into the order queue 50. The order queue 50 maintains the order of reference requests from the microengines 22a–22f. With a series of odd and even banks references it may be required that a signal is returned to both the odd and even banks. If the microengine 22f sorts the memory references into odd bank and even bank references and one of the banks, for example the even bank, is drained of memory references before the odd bank but the signal is asserted on the last even reference, the SDRAM controller 26a could conceivably signal back to a microengine that the memory request had completed, even though the odd bank reference had not been serviced. This occurrence could cause a coherency problem. The situation is avoided by providing the order queue 50 which permits a microengine to have multiple memory references outstanding, of which only its last memory reference needs to signal a completion.

The SDRAM controller 26a also included a high priority queue 44. If an incoming memory reference from one of the microengines goes directly to the high priority queue then it is operated upon at a higher priority than other memory references in the other queues.

A feature of the SDRAM controller 26a is that when a memory reference is stored in the queues, in addition to the optimized MEM bit that may be set, a "chaining bit" may be set to require special handling of contiguous memory references. A microengine context may issue chained memory references when the second and/or third reference of the chain must be scheduled by the SDRAM controller 26a immediately after the initial chained memory request. The global command arbiter 42 must ensure that chained references are delivered to consecutive locations of the same SDRAM controller queue.

The SRAM controller 26b also has four command queues: an eight-entry high priority queue 62, a sixteen-entry read queue 64, a sixteen-entry write order queue 66 and a twenty-four entry read-lock fail queue 68. A single physical RAM structure may be used to implement the four queues. The SRAM controller 26b is optimized based on the type of memory operation; i.e., a read or a write operation, and the predominant function that the SRAM performs is read operations.

The read lock fail queue 68 is used to hold read memory reference requests that fail because of a lock existing on a portion of memory. That is, one of the microengines issues a memory request that has a read lock request that is processed in an address and control queue. The memory request will operate on either the write order queue 66 or the read queue 64 and will recognize it as a read lock request. The SRAM controller 26b will access a lock lookup device to determine whether this memory location is already locked. If this memory location is locked from any prior read lock request, then this memory lock request will fail and will be stored in the read lock fail queue 68. If it is unlocked or if the lock lookup device shows no lock on that address, then the address of that memory reference will be used by the SRAM interface 26b to perform a traditional SRAM address read/write request to SRAM memory 16b. A command controller and address generator will also enter the lock into the lock look up device so that subsequent read lock requests will find the memory location locked. A memory location is unlocked by clearing a valid bit in a content addressable memory (CAM) of the SRAM controller. After an unlock, the read lock fail queue 68 becomes the highest priority queue giving all queued read lock misses a chance to issue a memory lock request. The read-lock miss queue is loaded by the SRAM controller itself and not directly from a microengine output buffer. The global arbiter 42 ensures that a command from a microengine to a SRAM queue is not selected on the same cycle that the SRAM controller must write a read-lock miss entry.

The FBUS interface 28 includes three command queues: an eight-entry push queue 72, an eight-entry pull queue 74 and an eight-entry hash queue 76. The pull queue is used when data is moved from a microengine to an FBUS interface resource, the push queue is used for reading data from the FBUS interface to a microengine, and the hash queue is used for sending from one to three hash arguments to a polynomial hash unit within the FBUS interface and for getting the hash result returned. The FBUS interface 28 in a network application can perform header processing of incoming packets from the FBUS 18. A key function performed by the FBUS interface 28 is extraction of packet headers, and a hashed lookup of microprogrammable source/destination/protocol in SRAM memory 16b. If the hash does not successfully resolve, then the packet header is subjected to more sophisticated processing.

The PCI bus interface 24 includes a single, two-entry direct memory access (DMA) command register 78. The DMA register provides a completion signal to the initiating microengine thread.

The global command arbiter 42 operates to select commands from the two-deep output command queues of each microengine for transmission to a destination queue in one of the functional units. The functional units include the core controller 20, the PCI interface 24, the SDRAM controller 26a, the SRAM controller 26b, the FBUS interface 28 and the microengines 22a to 22f. Each microengine request to the global command arbiter 42 is a three-bit encoded field that specifies the command type and destination. Each microengine global command arbiter request is serviced with the following priority:

1. SDRAM chained commands
2. SRAM
3. SDRAM
4. FBUS
5. PCI bus

The global arbiter maintains a pointer that indicates the last microengine request granted. If more than one request is present at the same priority, the global command arbiter selects the next higher numbered microengine (with a wrap-around feature). For example, the microengines 22a to 22f may be numbered from 1 to 6 in an implementation so that if a request from microengine 6 was the last one granted, then when priority is not an issue a request from microengine 1 is next up for consideration.

The three SRAM controller command queues 62, 64 and 66 are loaded directly from microengine commands. Since an SRAM command could be granted every cycle, it is possible that up to 6 additional SRAM commands will be granted and are in the pipeline, all of which could be destined for the same SRAM queue before a signal indicating that the queue is full is received by the global command arbiter. Thus, the SRAM controller asserts an SRAM_queue_full signal to the global command arbiter 42 if there is less than seven (7) empty entries in any SRAM command queue loaded from the microengines. For example, if the high priority queue has two entries filled then the SRAM_queue_full signal is asserted (because eight entries minus two entries is six). Similarly, if the read queue or the order queue contains ten entries then the SRAM_queue_full signal is asserted. This protocol is followed because a six cycle minimum latency exists from the assertion of a command request from a microengine and the command actually being stored in a destination queue.

The following diagram illustrates the timing of a request for a command destined for a queue in a system resource:

| 1 | 2 | 3 | 4 | 5 | 6 | 7 | 8 | 9 |
|---|---|---|---|---|---|---|---|---|
| Req | arb | gat | bus | cmd | rcv | full | arb | NOGNT |
| | req | arb | gnt | bus | cmd | rcv | full | arb |
| | | req | arb | gnt | bus | cmd | rcv | full |
| | | | req | arb | gat | bus | cmd | rcv |
| | | | | req | arb | gnt | bus | cmd |
| | | | | | req | arb | gnt | bus |
| | | | | | | req | arb | NOGNT |

Where: req=bus request from the microengine;

arb=arbitrate requests;

gnt=drive grant to appropriate microengine;

bus=enable tri-state bus driver;

cmd=drive command onto fx_cmd_bus;

rcv=receiving box queues command;

full=full_status_que signal driven if necessary;

nognt=a grant is not sent to queues that sent "full" by cycle 7.

Referring to the above timing diagram, in the first cycle, a request is sent to the global command arbiter. In cycle two, arbitration is performed and in cycle three the request is granted to the requesting microengine. In cycle four, a bus is enabled and in cycle five the command is driven onto the bus. In cycle six the receiving unit (SDRAM controller, SRAM controller, PCI bus interface or FBUS interface) queues the command. In cycle seven a full_status_que command is driven if necessary (e.g. that queue contains less than a minimum number of available entry spaces). In cycle eight, the global command arbiter is deciding whether another request should be granted to that system resource, but sees that the full_status_queue signal was generated. The arbiter then acts to deny requests (nognt) to the queue which sent a full signal by the seventh cycle.

The FBUS interface 28 has 3 command queues (pull, hash, push) which all contain eight (8) entries. Commands to the FBUS interface are not granted in consecutive cycles. Thus, when any of the 3 FBUS interface queues reaches four (4) entries (instead of the two discussed above for an eight entry queue) a FBUS_queue_full signal is sent to the global command arbiter since only a maximum of 3 commands can be in transit to the FBUS interface queues prior to the global arbiter detecting FBUS_queue_full.

The SDRAM controller 26a has 4 command queues (high=8, even=16, odd=16, order=24). The threshold for asserting SDRAM_queue_full is the same as for the SRAM, i.e. less than 7 entries available in any queue. However, commands to the SDRAM controller are not granted on consecutive cycles. This insures queue entry space for any SDRAM chained commands from a particular microengine, which must be granted, even after SDRAM_queue_full asserts. It is necessary to always transfer SDRAM chained commands to avoid a live-lock condition, in which the SDRAM controller is waiting for the chained command in one queue while the command is "stuck" in a microengine because the global arbiter is no longer granting SDRAM commands since a different SDRAM queue is "full". A limit is placed on the chain length of SDRAM commands to three as a coding restriction. In addition, when a chained SDRAM command is granted to a microengine, the next SDRAM command to be granted must also come from the same microengine so that the paired commands arrive in the selected SDRAM queue contiguously.

The restrictions of not sending commands to the FBUS on consecutive cycles, and not sending commands to the SDRAM on consecutive cycles do not degrade system performance since each command requires many cycles to actually execute. The restriction is not placed on SRAM commands since the SRAM queue sizing is more than adequate, and more SRAM references requiring fewer cycles with lower latency are issued in most applications.

Figure 3B:
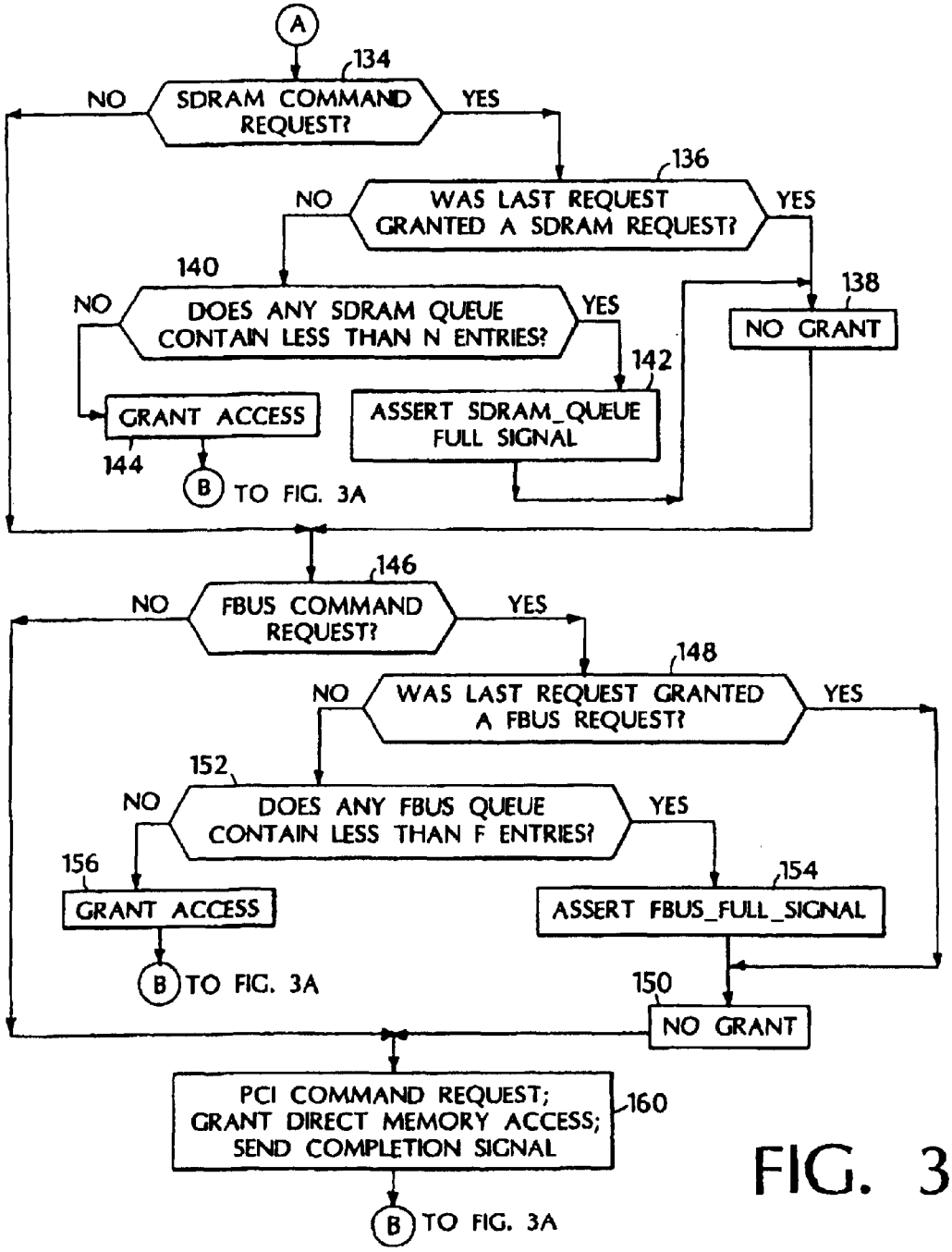

FIGS. 3A and 3B illustrate an implementation of a global command arbiter protocol process 100. The global command arbiter reviews 102 the command requests in the FIFO registers of the microengines 22a–22f. If all of the requests have the same priority 104, a pointer is checked 106 to determine the identity of the last microengine that had a request granted, and then the request of the next higher microengine is considered. Before granting the command request, the arbiter checks 108 to see if a queue_full_signal has been asserted. If so, the command request is denied 110 and the pointer is incremented 111 so that the next microengine's request will be considered. However, if no queue_full_signal has been asserted, then the command request is granted 112 and the flow returns to 102.

Referring again to step 104 of FIG. 3A, if the command requests in the microengines 22a to 22f have different priorities, then the global command arbiter checks 114 to see if a SDRAM request with a chained bit set has been granted previously. If so, then the SDRAM request from the same microengine that sent the previous SDRAM request with a chained bit is granted 116. Next, the SDRAM queues are checked 118 to determine if any contain less than "N" empty entries, where N is equal to the number of microengines plus one. In the implementation described above, the SDRAM_queue_full signal will be asserted 120 if any SDRAM queue contains less than seven (7) empty entries and then the flow returns to 102. If checking the queues 118 determines that the SDRAM queues have space for seven or more entries, then the flow returns to 102.

If there was no history of an SDRAM command request with a chained bit set 114, the global command arbiter determines 122 if there is a SRAM command request. If there is a SRAM request, the SRAM queues are checked 124 to see if any SRAM queue contains less than N empty entries. If so, then a SRAM_queue_full signal is asserted 126, the command request is denied and the flow moves to 134 where the arbiter determines if a SDRAM request has been made. However, if the answer 124 is no, then the arbiter checks 128 to see if the SRAM controller 26b needs to write a read_lock_miss entry. If so, then the command request is denied in step 130 and the flow moves to 134; if not, then the command request is granted 132 and the flow returns to 102.

If the answer was no at 122, then the arbiter checks 134 (see FIG. 3B) to see if a SDRAM request is being made. If so, the arbiter determines 136 if the last granted request was also a SDRAM command request. If it was, then the request is denied 138 and the flow goes to 146 where the arbiter determines if an FBUS command request has been made. Commands are not granted to the SDRAM controller in consecutive cycles to ensure that there is adequate queue entry space for a SDRAM chained command which is always granted when it occurs (even after a SDRAM_queue_full signal has been asserted). If the last granted command request was not an SDRAM command the SDRAM queues are checked 140 to see if any contains less than N entries. If so, then an SDRAM_queue_full signal is asserted 142, access is denied 138 and the flow moves to 146. If the SDRAM queues have adequate entry space, then the command request is granted 144 and the flow returns to 102.

If a SDRAM request is not being made 134, then the arbiter checks 146 to see if an FBUS command request has been made. If so, the arbiter checks 148 to see if the last granted request was a FBUS request. If so, then the request is denied 150 and the flow moves to 160 where the arbiter determines if a PCI command request has been made. Command requests to the FBUS are not granted in consecutive cycles to improve processing efficiency of the system. If the last granted request was not an FBUS command request 148, then the FBUS queues are checked 152 to see if any contain less than "F" empty entries. For the example discussed above where there are six microengines and each of the FBUS command queues (pull, hash, push) contains eight entries, F equals five (5) since only a maximum of three (3) commands can be in transit to the FBI queues. Thus, if four or fewer entries are available in any FBUS queue, then the FBUS_queue_full signal is asserted 154, the command is denied 150 and the flow moves to 160. However, if the FBUS queues have adequate space, the request is granted 156 and the flow returns to 102.

If an FBUS request is not made 146, a PCI command request has been asserted 160. Direct memory access is granted and a completion signal is sent, then the flow returns to 102.

It is to be understood that while implementations of the invention have been described, the foregoing description is intended to illustrate and not limit the invention, which is defined by the scope of the appended claims. For example, the flow chart depicted in FIGS. 3A and 3B could be modified to accommodate more, less or different system resources. Other aspects, advantages, and modifications are within the scope of the following claims.

What is claimed is:

1. A method for using a parallel, multi-threaded processor system comprising:

processing threads with a plurality of microengines, at least one microengine capable of processing at least two independent threads;

processing commands issued by the microengines using a plurality of system resource interface units that each include at least one commands queue; and utilizing a global command arbiter including a pointer to store the identity of [the] *a* last agent that had a request granted to determine whether a particular microengine command request should be granted.

2. The method of claim 1 wherein each microengine utilizes a FIFO commands register.

3. The method of claim 1 wherein the system resource units include at least one of a core controller, a SDRAM controller, a SRAM controller, a PCI bus interface and an FBUS interface.

4. The method of claim 3 wherein in at least one of the SDRAM controller, the SRAM controller and the FBUS interface utilize three command queues.

5. The method of claim 3 wherein in at least one of the SDRAM controller and the SRAM controller utilize a high priority queue.

6. The method of claim 3 wherein the SRAM controller utilizes a read lock fail queue.

7. The method of claim 3 wherein the PCI bus interface utilizes a single command register.

8. The method of claim 1, wherein the agent comprises at least one of the following: a microengine and a microengine thread.

9. The method of claim 1, wherein the threads comprise at least one thread that operates on a packet.

10. A communications system comprising:

at least one Ethernet medium access controller (MAC);

a multithreaded processor, the processor including:

a plurality of microengines for processing a plurality of hardware threads;

at least one of an ASB translator, a PCI bus interface, a SDRAM controller, a SRAM controller, and an bus interface to the Ethernet MAC; and a global command arbiter including a pointer to store the identity of [the] *a* last agent that had a request granted to determine whether a particular command request should be granted.

11. The system of claim 10 further comprising a FIFO commands register for each microengine.

12. The system of claim 10 wherein at least one of the SDRAM controller, the SRAM controller and the FBUS interface includes three command queues.

13. The system of claim 10 wherein at least one of the SDRAM controller and the SRAM controller includes a high priority queue.

14. The system of claim 10 wherein the SRAM controller includes a read lock fail queue.

15. The system of claim 10 wherein the PCI bus interface includes a single command register.

16. The [method] *system* of claim 10, wherein the agent comprises at least one of the following: a microengine and a microengine thread.

17. The [method] *system* of claim 10, wherein the threads comprise at least one thread that operates on a packet received via the at least one Ethernet MAC.

*18. A method comprising:*

*identifying a last programmable unit of a plurality of multiple multi-threaded programmable units within an integrated circuit to have a request granted; and*

*based, at least in part, on the identifying of the last programmable unit of the plurality of multiple multi-threaded programmable units within the integrated circuit to have a request granted, selecting a different one of the multiple multi-threaded programmable units within the integrated circuit to have a next request granted.*

*19. The method of claim 18, wherein the plurality of multiple multi-threaded programmable units within the integrated circuit are associated with a sequence of the multiple multi-threaded programmable units within the integrated circuit; and wherein selecting the one of the multiple multi-threaded programmable units within the integrated circuit to have a next request granted comprises selecting a next one of the multiple multi-threaded programmable units within the integrated circuit in the sequence.*

*20. The method of claim 18, further comprising:*

*selecting a memory access operation issued by the selected one of the multiple multi-threaded programmable units within the integrated circuit.*

*21. An integrated circuit, comprising:*

*multiple multi-threaded programmable units in the integrated circuit; and*

*logic, communicatively coupled to the multiple multi-threaded programmable units, to:*

*identify a last programmable unit of the plurality of multiple multi-threaded programmable units within the integrated circuit to have a request granted; and*

*based, at least in part, on the identified last programmable unit of the plurality of multiple multi-threaded programmable units within the integrated circuit to have a request granted, select a one of the multiple multi-threaded programmable units within the integrated circuit to have a next request granted.*

*22. The integrated circuit of claim 21, wherein the plurality of multiple multi-threaded programmable units within the integrated circuit are associated with a sequence of the multiple multi-threaded programmable units; and wherein the logic to select the one of the multiple multi-threaded programmable units within the integrated circuit to have a next request granted comprises logic to select a next one of the multiple multi-threaded programmable units in the sequence.*

*23. The integrated circuit of claim 21, wherein the logic comprises an arbiter coupled to the multiple multi-threaded programmable units and to a memory controller to a memory shared by the multiple multi-threaded programmable units.*

*24. The integrated circuit of claim 21, wherein the logic further comprises logic to:*

*select a memory access operation issued by the selected one of the multiple multi-threaded programmable units within the integrated circuit.*

*25. A method for using a parallel, multi-threaded processor system comprising:*

*processing threads with a plurality of microengines, at least one microengine capable of processing at least two independent threads;*

*processing commands issued by the microengines using a plurality of system resource interface units that each include at least one commands queue; and*

*storing an identity of a last agent that had a request granted to determine whether a particular microengine command request should be granted, wherein a pointer is included to store the identity.*

*26. The method of claim 25, wherein each microengine utilizes a FIFO commands register.*

*27. The method of claim 25, wherein the system resource units include at least one of a core controller, a SDRAM controller, a SRAM controller, a PCI bus interface and an FBUS interface.*

*28. The method of claim 27, wherein at least one of the SDRAM controller, the SRAM controller and the FBUS interface utilize three command queues.*

*29. The method of claim 27, wherein in at least one of the SDRAM controller and the SRAM controller utilize a high priority queue.*

*30. The method of claim 27, wherein the SRAM controller utilizes a read lock fail queue.*

*31. The method of claim 27, wherein the PCI bus interface utilizes a single command register.*

*32. The method of claim 25, wherein the agent comprises at least one of the following: a microengine and a microengine thread.*

*33. The method of claim 25, wherein the threads comprise at least one thread that operates on a packet.*

*34. A communications system comprising:*

*at least one Ethernet medium access controller (MAC);*

*a multithreaded processor, the processor including:*

*a plurality of microengines for processing a plurality of hardware threads;*

*at least one of an ASB translator, a PCI bus interface, a SDRAM controller, a SRAM controller, and an bus interface to the Ethernet MAC; and*

*a pointer to store an identity of a last agent that had a request granted, the system configured to determine whether a particular command request should be granted.*

*35. The system of claim 34 further comprising a FIFO commands register for each microengine.*

*36. The system of claim 34 wherein at least one of the SDRAM controller, the SRAM controller and the FBUS interface includes three command queues.*

*37. The system of claim 34 wherein at least one of the SDRAM controller and the SRAM controller includes a high priority queue.*

*38. The system of claim 34 wherein the SRAM controller includes a read lock fail queue.*

*39. The system of claim 34 wherein the PCI bus interface includes a single command register.*

*40. The system of claim 34, wherein the agent comprises at least one of the following: a microengine and a microengine thread.*

*41. The system of claim 34, wherein the threads comprise at least one thread that operates on a packet received via the at least one Ethernet MAC.*

* * * * *